United States Patent [19]
Brambilla et al.

[11] 3,729,101
[45] Apr. 24, 1973

[54] DAMPER DEVICE FOR RAILWAY VEHICLE AUTOMATIC COUPLINGS

[75] Inventors: Guido Brambilla; Vittorio Fogliacco, both of Turin, Italy

[73] Assignee: RIV-SKF Officine Di Villar Perosa S.p.A., Turin, Italy

[22] Filed: Apr. 7, 1971

[21] Appl. No.: 132,026

[30] Foreign Application Priority Data

May 4, 1970 Italy.................................68534 A/70

[52] U.S. Cl. .........................213/45, 213/43, 267/35
[51] Int. Cl................................................B61g 9/08
[58] Field of Search .......................213/8, 40 R, 40 D, 213/43, 45, 223; 267/64 R, 65 R, 35; 188/317

[56] References Cited

UNITED STATES PATENTS

| | | |
|---|---|---|
| 2,985,319 | 5/1961 | Simmons................................213/43 |
| 3,164,262 | 1/1965 | Price et al. ..............................213/43 |
| 2,713,485 | 7/1955 | Tillou...................................213/40 D |
| 3,412,870 | 11/1968 | Rollins ...................................188/317 |
| 3,446,317 | 5/1969 | Gryglas .....................................213/43 |
| 3,031,089 | 4/1962 | Spencer et al...........................213/43 |
| 3,040,907 | 6/1962 | Pelabon....................................213/45 |
| 3,249,240 | 5/1966 | Empson....................................213/43 |
| 3,344,894 | 10/1967 | Kenworthy...............................213/43 |

*Primary Examiner*—Drayton E. Hoffman
*Attorney*—Sughrue, Rothwell, Mion, Zinn & Macpeak

[57] ABSTRACT

A damper device for automatic couplings in railway vehicles has elastic and hydraulic parts, the hydraulic part being double-acting and having two chambers which are interconnected through a variable flow restriction, for example a nozzle formed in part by a shaped axial pin, such that the damping force varies progressively in response to movement applied to the device.

1 Claim, 4 Drawing Figures

INVENTORS
GUIDO BRAMBILLA
VITTORIO FOGLIACCO
BY Sughrue, Rothwell, Mion, Zinn & Macpeak
ATTORNEYS

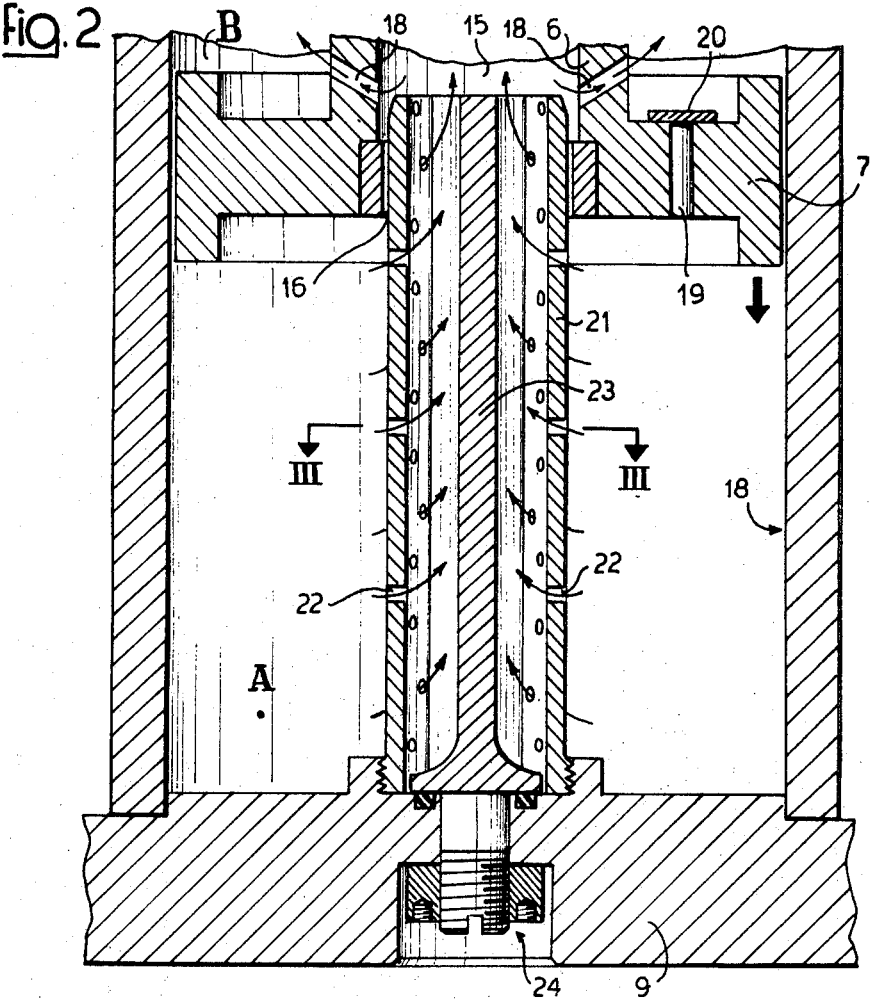
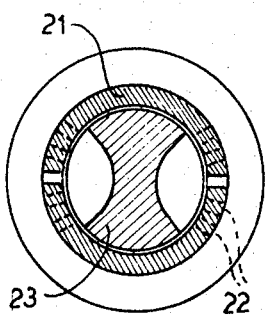
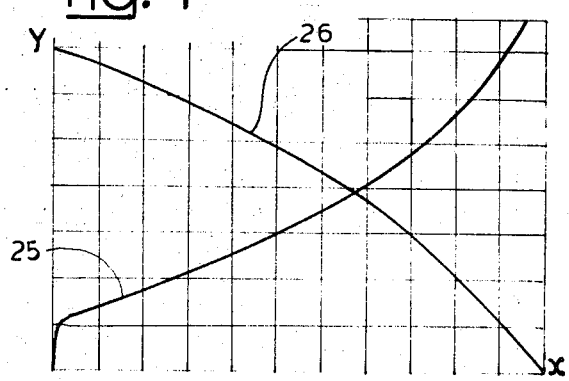

3,729,101

DAMPER DEVICE FOR RAILWAY VEHICLE AUTOMATIC COUPLINGS

BACKGROUND OF THE INVENTION

This invention relates to damper devices for automatic couplings of railway vehicles.

As is known, the task of damper devices in railway vehicle coupling is to absorb the energy of the impact between two vehicles upon coupling thereof and to return only a small part of this energy to the vehicles, thereby minimizing recoil.

Damper devices are known which are made up solely of metal springs or of elastomeric material: such resilient damper devices are able to absorb energy but not to disperse it sufficiently.

Mixed dampers are known which have an elastic part and an hydraulic part which, whilst permitting better results, do not permit precise control of the damping characteristics during impact between two vehicles.

An object of the present invention is to avoid the said disadvantages by providing a damper device which operates efficiently upon impact with good energy absorption.

An object of a preferred embodiment of the invention is to provide a damper device as aforesaid having different damping effects upon compression and recovery, and which exhibits a considerable damping action in the recovery phase.

A further object of the invention is to provide a damper device in which it is possible to vary the overall damping characteristic, in accordance with the given requirements of the device.

SUMMARY OF THE INVENTION

According to the invention there is provided a damper device for automatic couplings of railway vehicles, comprising an elastic part, a double-acting hydraulic part having two chambers, and means interconnecting the two chambers including an element responsive to movement applied to the device to vary progressively the effective resistance to flow of hydraulic fluid between said two chambers.

BRIEF DESCRIPTION OF THE DRAWINGS

Some practical embodiments of the invention will now be described by way of non-limiting example, with reference to the accompanying drawings, in which:

FIG. 2 is a diagrammatic axial section of part of a damper device showing a variant of the embodiment of FIG. 1;

FIg. 3 is a cross section taken along III—III of FIG. 2, and

FIG. 4 is a diagram illustrating the reaction characteristic of the damper device as a function of the relative movement to which it is subjected.

DETAILED DESCRIPTION WITH REFERENCE TO THE DRAWINGS

Figure 1:
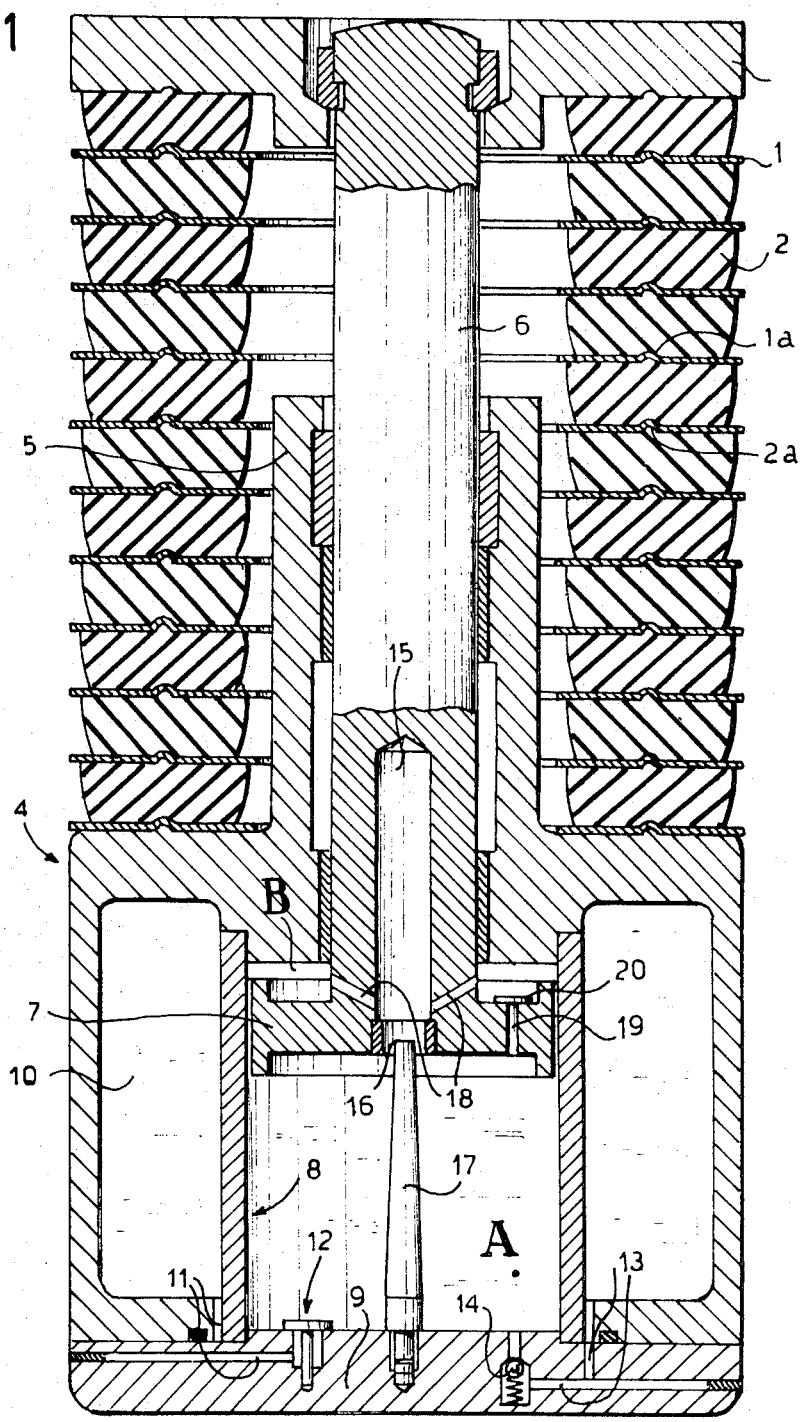
FIG. 1 is a diagrammatic axial section of a damper device according to one embodiment of the invention.

As illustrated in FIG. 1, the damper device according to the invention includes an elastic part constituted by a stack of flat metal elements 1, in the form of flat plates, on to each of which is stuck a respective elastically yielding element 2, preferably of high hysteresis rubber. The elastic elements 2 are assembled in the device in a pre-compressed state. The elastic elements 2 are each provided with co-operating projections and indentations 1a, 2a, on their opposite flat faces to allow interlocking of each element 2 with the adjacent elements of the stack, the metal elements 1 having suitable recesses to permit such interlocking.

The stack of elements 1, 2 forming the elastic part of the damper device is interposed between a terminal plate 3 and a casing 4 situated at opposite ends of the stack and movable relatively to each other.

The damper device further includes an hydraulic part which is contained in the casing 4. The hydraulic part comprises a stem 6 mounted for sealed sliding movement within a tubular appendage 5 of the casing 4 and bearing at one end, within the casing, a piston 7 which makes sealed sliding contact with the internal surface of a cylinder 8 housed coaxially within the casing 4. An interior chamber A is defined within the cylinder 8 between the piston 7 and a sealing base 9.

The cylinder 8 is surrounded by an annular tank 10, which acts as a reservoir for the hydraulic fluid (oil). The reservoir tank 10 communicates with the chamber A of the cylinder 8 by means of at least two sets of passages 11, 13. The first passage 11 opens into the chamber A through a non-return valve 12, within the base 9, which is adapted to close when the pressure in the chamber A exceeds that in the passage 11, while the other passage 13 opens into the chamber A through a non-return valve 14 within the base 9 which opens only when the pressure in the chamber A exceeds that in the passage 13 by at least a predetermined amount, determined by the force of a spring acting on said valve.

The end of the stem 6 adjacent the piston 7 is provided with an axial blind bore 15 which communicates with the chamber A of the cylinder 8 through a calibrated nozzle 16. The nozzle 16 is partly defined by a central pin 17, projecting axially from the base 9 of the cylinder and having a cross-section which varies along its length so as to vary the effective nozzle aperture in dependence upon the positition of the piston 7 within the cylinder 8. The blind bore 15 of the stem 6 communicates with a rear chamber B within the cylinder 8, on the other side of the piston 7 from the chamber A, by means of drillings 18.

The piston 7 is also provided with one or more axial passages 19 (one only of which is shown) normally closed by non-return valves 20 which can open only during the approach of the piston 7 towards the cylinder base 9.

The operation of the damper device will now be described.

It will be supposed that some external action initiates an axial compression of the device, the chamber A being full of oil.

The stack of elastic elements 2 shortens axially, and the piston 7 moves towards the base 9 of the cylinder 8, compressing the oil in the chamber A. Oil is expelled from the chamber A through the nozzle 16 and the drillings 18 and passes into the rear chamber B of the cylinder 8. Part of the oil, under pressure, also flows directly through the passages 19 of the piston 7 into the chamber B, the valves 20 being open at this stage to permit such flow.

Because the stem 6 of the piston 7 enters the cylinder chamber B it is not possible for all the oil expelled from the chamber A to pass into the chamber B; part of this oil therefore flows out of the cylinder 8 through the passages 13 controlled by the non-return valves 14 and enters the reservoir tank 10.

The resistance offered by the damper device to the applied compression results from the combined flow-restricting action of the valves 20 and 14 and the throttling action of the nozzle 16, which throttling action varies as the piston 7 approaches the cylinder base 9 by virtue of the varying cross section of the pin 17.

In the embodiment illustrated in FIG. 1 the damper device is adapted to achieve the damping of impacts such as occur upon coupling of two railway vehicles and the pin 17 has a conical shape, tapering in cross section away from the base 9, presupposing that the speed of the piston is to decrease linearly and with a damping coefficient which is inversely proportional to the speed of the piston 7 in the cylinder 8.

The damper device may be arranged so as to provide a constant reaction during impact by making the elastic part and the hydraulic part with complementary characteristics, as shown graphically in FIg. 4. FIG. 4 shown, superimposed, the reaction characteristics of the elastic part (curve 25) and the hydraulic part (curve 26) of the device: the sum of the ordinates of the two curves 25 and 26 is constant over a range of relative movement of the piston 7 and cylinders 8, represented on the abscissa $x$. In the two curves 25 and 26 the ordinates $y$ represent the values of the total reaction exerted by the respective parts of the damper device for the maximum speed of impact.

The pin 17 could be shaped in different ways in order to obtain different specific behavior characteristics from the damper device.

The return or recovery phase of movement of the damper device after an impact is brought about by the reaction exerted by the compressed stack of elastic elements 2. As the compression of the elements 2 is relieved the piston 7 is drawn away from the cylinder base 9 and oil is able to pass from chamber B to chamber A only through the drillings 18 and the nozzle 16, since the non-return valves 20 are closed. Consequently a considerable damping force is exerted in this phase, giving a low return speed for the piston 7.

Owing to the presence of the stem 6 within the chamber B the increase in volume of the chamber A exceeds the reduction in volume of the chamber B and this discrepancy is made up by oil flowing into the chamber A, through the non-return valves 12, from the reservoir tank 10, so that the chamber A is always entirely full of oil.

In FIGS. 2 and 3 there is illustrated a variant of the damper device in which the conical pin 17 is replaced by a tubular element 21 secured centrally to the base 9 of the cylinder 8. The tubular element 21 is provided with radial vents 22 distributed in the wall of the element 21 according to a pre-arranged pattern and adapted to allow flow of the oil, with a predetermined flow resistance, towards the blind bore 15 of the stem 6 and into the drillings 18. An inner rod 23 is mounted coaxially within the tubular element 21. The rod 23 is rotatable about the longitudinal axis of the cylinder 8, rotational adjustment of the rod 23 being effected from outside and the rod being lockable by means of a ring nut 24 or equivalent means.

The inner rod 23 is in the shape of a cylinder with two diametrically opposite longitudinal channels in its surface (FIG. 3). The solid portions of the rod 23 between the longitudinal channels can be arranged to obstruct, at least partially, the vents 22 in the wall of the tubular element 21 by adjusting the relative angular position of the rod 23 within the tubular element 21. The damping regimen can therefore be varied at will by adjusting from the outside the angular position of the rod 23 within the tubular element 21.

The longitudinal distribution of the vents 22 in the wall of the tubular element 21 allows of a progressive damping of the piston travel, analogously to the varying cross section of the pin 17 in the embodiment of FIG. 1, while the circumferential distribution of the vents 22 allows of a greater or lesser range of adjustment of the overall damping characteristics of the device by means of the rod 23.

It will be appreciated that details of construction of specific embodiments of the invention may be varied widely from those described and illustrated, without nevertheless departing from the scope of this invention.

What is claimed is:

1. A damper device for an automatic coupling of a railway vehicle comprising a cylinder for containing hydraulic liquid, a piston slidably mounted in said cylinder and dividing said cylinder into a first chamber and a second chamber, said piston having a passage therethrough interconnecting said first and second chambers, a flow regulating element fixed in said first chamber and extending into said passage, said piston having a stem extending axially outwardly of said cylinder, a terminal force receiving plate secured to the end of said stem and resilient means disposed intermediate said terminal force receiving plate and said cylinder, and means for compensating changes in the combined volume of said first and second chambers upon movement of the piston and stem within said cylinder, said compensating means comprising wall means defining an annular auxiliary chamber surrounding said cylinder for containing hydraulic fluid and a gas, first and second conduit means extending between said auxiliary chamber and said first chamber, first valve means associated with said first conduit for permitting the unrestricted flow of hydraulic fluid from said auxiliary chamber to said first chamber but totally preventing the flow from said first chamber to said auxiliary chamber and a second valve means associated with said second conduit having calibrated spring means which permits restricted flow of hydraulic fluid from said first chamber to said auxiliary chamber but prevents flow from said auxiliary chamber to said first chamber.

* * * * *